Patented July 13, 1954

2,683,726

UNITED STATES PATENT OFFICE 2,683,726

HYDROCARBON SYNTHESIS WITH REDUCED MAGNETITE CATALYST

Henry G. McGrath, Elizabeth, and Louis C. Rubin, West Caldwell, N. J., assignors to The M. W. Kellogg Company, Jersey City, N. J., a corporation of Delaware No Drawing. Original application March 18, 1947, Serial No. 735,536. Divided and this application January 25, 1949, Serial No. 72,758

25 Claims. (Cl. 260—449.6)

This invention relates to the synthesis of organic compounds. In one aspect this invention relates to the hydrogenation of a carbon oxide with an iron catalyst to produce organic compounds. In another aspect this invention relates to a method for manufacturing a hydrogenation catalyst which is useful in the production of organic compounds from carbon monoxide and hydrogen. Carbon oxides include carbon dioxide and organic compounds containing a carbonyl group, such as ketones, aldehydes, etc. This application is a division of application S. N. 735,536, now U. S. Patent No. 2,543,327.

It has been known for some time that hydrogen and carbon monoxide may be made to react exothermically in the presence of catalysts under specific reaction conditions to form hydrocarbons and oxygenated compounds. In general, the synthesis of these organic compounds by the hydrogenation of carbon monoxide is accomplished in the presence of a metal or an oxide of a metal chosen from group VIII of the periodic table as a catalyst at pressures below about 500 pounds per square inch gage and at temperatures below about 750° F.

The synthesis feed gas or reaction mixture comprises a mixture of about two mols of hydrogen per mol of carbon monoxide and may be prepared by the catalytic conversion of natural gas, steam, and carbon dioxide, or the partial oxidation of natural gas with oxygen.

Various techniques have been practiced to effect the reaction of hydrogen and carbon monoxide to produce organic compounds. Among these techniques are those known as fixed-bed catalyst operations and fluid-bed catalyst operations. The fixed-bed operation comprises passing a reaction mixture of hydrogen and carbon monoxide through a stationary bed of catalyst in a reaction zone, and the fluid-bed operation comprises passing a reaction mixture through a finely-divided catalyst mass suspended in the reaction mixture in the reaction zone.

It is an object of this invention to provide a process for the synthesis of organic compounds. Another object of this invention is to hydrogenate carbon monoxide in the presence of an iron catalyst to produce organic compounds having more than one carbon atom per molecule.

A further object is to provide a catalyst which is more selective and results in increased yields of hydrocarbons having more than one carbon atom per molecule and of oxygenated organic compounds.

It is another object of this invention to provide a method for manufacturing a hydrogenation catalyst.

It is still a further object of this invention to provide a novel catalyst for the hydrogenation of an oxide of carbon.

A still further object of this invention is to provide a method for manufacturing catalyst which is much less expensive than those heretofore used.

It is another object of this invention to provide an improved and relatively inexpensive hydrogenation catalyst.

Further objects and advantages of this invention will become apparent to those skilled in the art from the accompanying description and disclosure.

According to this invention, a highly satisfactory and improved catalyst for the hydrogenation of an oxide of carbon to produce organic compounds is manufactured from a naturally occurring iron compound, such as magnetite. According to an embodiment of this invention, naturally occurring magnetite is fused under conditions such that a molten mass is formed and thereafter the molten mass is cooled sufficiently to solidify the same. The solidified fused mass is reduced to produce a very active and selective catalyst containing iron as the major component.

Generally, the fusion of the naturally occurring magnetite is carried out at a temperature above about 2000° F.; the actual temperature will depend upon the other ingredients accompanying the magnetite, such as alumina, silica, and titanium oxide, which tend to lower the fusion temperature of the magnetite. After fusion and solidification, the fused mass is crushed and ground to a relatively small size, and then reduced with a reducing gas, such as hydrogen, at a temperature of at least 900° F. at atmospheric pressure and as high as 1600° F. The reduction may be carried out at substantially lower temperatures when super-atmospheric pressures are used; such temperatures may be as low as about 600° F. to about 800° F. The reduction process is carried out for a sufficient length of time to reduce about 90 to 95 per cent of the magnetite, usually indicated by the cessation of the formation of water.

A conveniently available and relatively cheap naturally occurring magnetite is concentrated Alan Wood ore which contains about 1 to 2 per cent alumina, about 1 per cent silica, about 0.4 to 1 per cent titanium oxide by weight, and the remainder magnetite ($Fe_3O_4$) and is a native ore of New Jersey. Since it is desirable in most instances to have present in the ultimate catalyst a minor amount of potassium oxide and other promoting ingredients, it is often necessary when using a naturally occurring magnetite to add these promoters to the catalyst. According to one modification of this invention, such promoters are incorporated into the catalyst by mixing them with the Alan Wood ore prior to fusion. The promoters are often added in the form of elements, oxides, carbonates, hydroxides, etc. to the concentrated Alan Wood ore and thoroughly mixed therewith before fusion. The promoters may be added and mixed dry or they may be added in the form of an aqueous solution and mixed with the Alan Wood ore to form a paste therewith. When the promoters are added as an aqueous solution to form a paste with the concentrated Alan Wood ore, the paste is dried, preferably at a temperature between about 200° F. and about 300° F. for several hours, and the resulting hard cake is crushed and then fused.

As used in this specification promoters or activators are used synonomously and include a material containing a metal or silicon incorporated in a minor amount with the iron compound during the catalyst preparation, or which is present as a minor component of the ultimate catalyst, and which has a substantially beneficial effect on the desired reaction. It is believed that, although promoters may be admixed with the magnetite during preparation of the catalyst in forms other than the oxides, the actual promoting materials in the ultimate catalyst usually, although not necessarily, consist of the oxides. Since naturally occurring magnetite often contains small amounts of alumina, silica, and titania, these promoting materials may be present in the final catalyst in small amounts regardless whether they were added or not. Usually alumina, silica, and titania of the original ore are present in reduced magnetite in a total amount less than about 2 weight per cent. Promoters or activators which may be added to the magnetite ore during the catalyst preparation comprise metals and silicon and their compounds including oxides, nitrates, sulfates, chlorides, carbonates, hydroxides, and organic compounds. For example, the following may be used singly or in combination: Co, Ni, Ti, Si, Al, $TiO_2$, CuO, $Al_2O_3$, $SiO_2$, $K_2O$, $CoO_2$, MgO, MnO, $ThO_2$, $MoO_3$, $K_2CO_3$, $Al(COOH)_3$, $Al(NO)_3$, $Mn(NO_3)_2$, ZnO, $Ce(OH)_4$, KOH, $Co(NO_3)_2$, $H_2MoO_4$, KCl, $SiCl_4$, $AlCl_3$, $H_2SiO_3$, $Rb_2CO_3$, and $Cs_2CO_3$. When present in the final catalyst preparation as promoters, the oxides of silicon, aluminum, titanium, molybdenum, cobalt, copper, manganese, and thorium preferably constitute in total between about 0.1 and about 10 weight per cent of the catalyst. Potassium calculated as the oxide has been found to be a very desirable promoter or activator when present in the resulting catalyst between about 0.2 and about 2.5 per cent.

When the promoters are added to the Alan Wood ore and fused, it is believed that they often form a solution with the $Fe_3O_4$ in the molten state and, when cooled and solidified, may be present as a solid solution with $Fe_3O_4$. Thus, it is preferred that such promoters be added prior to fusion. During fusion certain additive materials decompose and remain in solid solution, for example, as the oxides. The reduction process reduces $Fe_3O_4$ to metallic iron (Fe) and may in some instances reduce the promoters.

The exact composition of the resulting catalyst with respect to promoters is not certain, but the promoters are considered to be present in minor amount in the ultimate catalyst composition as the oxides unless added in a form that does not change during fusion. Whatever the exact form of the promoters in the reduced catalyst, they are found to have a great influence upon the activity and selectivity of the catalyst itself, especially when incorporated in the catalyst according to this invention.

Since iron in the reduced form is somewhat malleable, it is highly desirable to crush and grind the material to the required size for use as catalyst prior to reduction. Where the catalyst is to be used in a fluidized operation in a finely-divided form, the fused material is ground to a size less than about 30 mesh, and formed, e. g. by pelletting, briquetting, extrusion, etc., prior to reduction and then reduced. After reduction the material is broken into its previously finely-divided state but with much less effort than would be required had the reduced material not been ground and pulverized prior to reduction.

Merely fusing concentrated Alan Wood ore and reducing the solidified fused material often produces a sufficiently active catalyst for the hydrogenation of carbon monoxide since the ore itself contains small amounts of alumina, silica, and titania. However, when it is desired to produce the minimum amount of methane and carbon dioxide in the hydrogenation of carbon monoxide, a minor proportion of a material containing an alkali metal, such as potassium, or an alkaline earth, should be present in the catalyst. The presence of potassium in the ultimate catalyst composition is achieved by incorporating potassium carbonate, potassium hydroxide, or potassium nitrate with the Alan Wood ore, prior to fusion or, as is preferable in some instances, with the fused material just prior to reduction. In the latter case the carbonate, hydroxide, or nitrate of potassium is added after the ore has been fused. Generally, it is desirable to have an increased amount of alumina, silica, or titania present in the ultimate catalyst than is present in the Alan Wood ore itself and, consequently, one or more of these materials are added in minor amount in the form of the compounds previously mentioned to the concentrated Alan Wood ore prior to fusion. It is understood that other promoters may be added in addition or instead of these mentioned above without departing from the scope of this invention.

Reducing naturally occurring magnetite without fusion will produce a hydrogenating catalyst. However, to obtain both maximum activity and selectivity it is much preferred to fuse the naturally occurring magnetite prior to reduction, especially when it is necessary to add additional promoters to the catalyst; since by fusion the promoters are usually brought into solution with the magnetite. Even in the case of naturally occurring magnetite, such as Alan Wood ore, only a portion of the alumina and silica in the ore may be present in solid solution with the magnetite. To obtain more of this material in solid solution, the ore is fused in order that the beneficial effect of all of the alumina, silica, and titanium oxide present in the original ore may be realized In a modification of this invention, the naturally occurring magnetite is not fused but is only heated to a moderately high temperature, preferably above 1000° F. This moderate temperature treatment is referred to herein as calcination and may be effected in an oxidizing, reducing, or inert atmosphere without departing from the scope of this invention. In most instances the calcination is carried out in a substantially inert or a substantially oxidizing atmosphere. In this moderate temperature heat treatment, a lower temperature is used than in the case of fusion and for this reason replacing fusion by such a calcination treatment results in a much cheaper and more economical process for the manufacture of a synthesis catalyst. The promoting materials may be added either prior or subsequent to the calcination treatment. In case of the alkali metal and alkaline earth metals, such promoters are preferably added subsequent to calcination. Other promoters if used in addition to the alkali promoters are preferably added prior to calcination. After the naturally occurring magnetite, such as Alan Wood ore, has been calcined, with or without the presence of added promoting material, the calcined material is ground to the desired size and then reduced. The calcination of the ore may be carried out at a temperature as low as 1000° F. but is usually carried out at a temperature between about 1400° F. and about 1600° F. for a time between about 2 and about 12 hours, which time depends, of course, upon the temperature used. At higher temperatures shorter heating periods are necessary than at lower temperatures. As previously mentioned, it is preferred to add the potassium carbonate or hydroxide after calcination either by mixing dry or by mixing an aqueous solution of the compound with the calcined material. When the promoter is mixed as an aqeous solution with the calcined material to form a paste, the paste is dried, preferably at a temperature between 200° F. and 300° F., for at least two hours. After the calcined material has been dried, it is reduced at a temperature preferably between about 1400° F. and about 1500° F., or at lower or higher temperatures as previously discussed.

Coking inhibitors may be added to the fused or calcined mass just prior to reduction. Such coking inhibitors include $SnCl_4$, and $Pb(NO_3)_2$.

Calcining the naturally occurring magnetite in the presence of added promoters may have much the same effect as the fusion since it may cause a dispersion of the promoters on the surface of the particles of the naturally occurring magnetite, thus increasing the beneficial effect of the promoting materials.

The catalyst of this invention may be employed either in stationary bed or in fluidized operations with improved results; however, it is much preferred to use the catalyst in the fluidized operation.

A preferred embodiment of this invention involves flowing a gaseous mixture comprising hydrogen and a carbon oxide to be hydrogenated upwardly in a reaction zone in contact with a mass of finely-divided metallic iron catalyst prepared in the manner described herein. The hydrogen and carbon oxide reactants are passed as gases through the reaction zone, under conditions effective to react all, or a major proportion, of the carbon oxide reactant. The gaseous mixture is passed upwardly through the mass of catalyst at a velocity sufficient to suspend or entrain the catalyst mass in the gas stream. Preferably, the velocity of the gas stream passing through the reaction zone is sufficiently low to maintain the catalyst mass in a dense, fluidized, pseudo-liquid condition. However, the velocity may be sufficiently high to entrain at least a substantial portion of the finely-divided catalyst in the gas stream to form a continuous catalyst phase which circulates with the flowing gas stream, without departing from the scope of this invention. In the former condition the catalyst mass may be said to be suspended in the gas stream, but not entrained therein in the sense that there is movement of the catalyst mass as such in the direction of flow of the gas stream. When operating in the pseudo-liquid condition it is preferred to maintain the upward velocity of the gas stream sufficiently high to maintain the fluidized catalyst mass in a highly turbulent condition in which the catalyst particles circulate at a high rate in the pseudo-liquid mass. In this pseudo-liquid condition of operation a small proportion of catalyst in the fluidized mass may become entrained in the gas stream emerging from the upper surface of the fluidized mass whereby catalyst thus entrained is carried away from the mass.

In the present process it is preferred to employ the hydrogen and carbon oxide in ratios such that there is a substantial excess of hydrogen. Therefore, the charging rate in the present process is defined by reference to the rate at which the carbon oxide is charged, in terms of standard cubic feet, in the gas form, of the carbon oxide per hour per pound of the metal catalyst in the dense pseudo-liquid mass of catalyst in the reaction zone. The fluidized process is preferably operated at a minimum space velocity equivalent to charging rate of about 1.0 standard cubic foot of the carbon oxide reactant, per hour per pound of the metal catalyst in the dense catalyst phase. A standard cubic foot of the carbon oxide is that quantity of a normally gaseous carbon oxide which would occupy one cubic foot of atmospheric pressure at 60° F., or an equivalent quantity of a normally liquid carbon oxide reactant.

The catalyst material employed in the present invention is a finely-divided powder comprising metallic iron containing the appropriate amount of promoter or promoters incorporated with the iron in the manner described hereinbefore, or a mixture of such iron catalyst and other catalytic materials or noncatalytic materials. While the catalyst powder consists essentially of such catalytic material prepared according to this invention, it may include also ingredients, and supporting materials, such as alumina, silica gel, bentonite type clay, etc. In this specification and claims the catalyst composition is described by reference to its chemical condition prior to contact with the reactants.

Preferably, the powdered catalyst initially contains no more than minor proportion by weight of material whose particle size is greater than 250 microns. Preferably, also, the greater proportion of the catalyst mass comprises material whose particle size is smaller than 100 microns, including at least 25 weight per cent of the material in particle sizes smaller than 40 microns. A highly desirable powdered catalyst comprises at least 75 per cent by weight of material smaller than 150 microns in particle size, and at least 25 per cent by weight smaller than about 40 microns in particle size.

In the preferred form of the invention with the catalyst present in a pseudo-liquid condition, the powdered catalyst mass of iron is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the concentration of catalyst is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carry capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of very much lower average concentration, there is a relatively narrow zone in which the concentration of solids in the gas stream changes in a short space from the high concentration of the dense phase to the low concentration of the diffuse phase. This zone has the appearance of an interface between two visually distinct phases.

This dense phase operation ordinarily involves employment of catalyst powders and gas velocities such that a relatively small portion of the fluidized catalyst is carried away by entrainment, and it is necessary, therefore, to provide means in the reactor for separating such entrained catalyst and returning it to the dense phase, or to provide means externally of the reactor to separate the small amount of entrained catalyst from the gas stream and return it to the reactor, or otherwise to recover catalyst from the product gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form consisting of the metallic iron catalyst and containing at most minor proportions of promoting agents provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The pseudo-liquid operation, employing the finely-divided metal catalyst, results in initial catalyst concentrations of at least 30 pounds per cubic foot of the fluidized dense catalyst phase, while preferred gas velocities result in initial concentrations of 40 to 120, or more, pounds per cubic foot of dense phase. It will be understood that these figures refer to the initial average concentration in the dense phase. The accumulation of reaction products on the catalyst particles as the operation proceeds reduces the catalyst density and increases the bulk of the dense fluidized mass.

With the improved iron catalyst of this invention temperatures in the range of about 550° F. to about 750° F. and pressures between atmospheric pressure and the maximum pressure at which condensation is avoided may be employed. It is desirable, however, to employ pressures of at least 80 p. s. i. and preferably about 150 to about 500 p. s. i.

In this specification, pressures are expressed as pounds per square inch gage and gas volumes as cubic feet measured at 32° F. and atmospheric pressure.

The linear velocity of the gas stream passing upwardly through the dense phase is conveniently expressed in terms of the superficial velocity, which is the linear velocity the charge gas stream would assume if passed through the reactor in the absence of catalyst, and takes into account the shrinkage in volume caused by the reaction. These superficial velocities preferably are in the range of from 0.1 to 6 feet per second for the dense phase operation. When operating with a continuous catalyst phase in which the catalyst is entrained in the flowing gaseous mixture, velocities as high as 40 feet per second may be employed.

The reactants are passed into and through the reaction zone at a space velocity equivalent to at least 1.0 standard cubic foot of the carbon dioxide per hour per pound of metal catalyst in the dense catalyst phase. In the hydrogenation of carbon monoxide with the iron catalyst of this invention, it is preferred to operate at a space velocity equivalent to at least 2.0 standard cubic feet of carbon monoxide per hour per pound of iron catalyst in the dense catalyst phase. The charging rate is defined by reference to the carbon monoxide reactant, since the ratio of the hydrogen reactant to the carbon monoxide reactant in the charge gas may vary within wide limits. This ratio of hydrogen to carbon monoxide is usually in excess of 1:1, and preferably at least 2:1, and may be as high as 10:1. At the 1:1 ratio the preferred charging rate of hydrogen and carbon monoxide would, therefore, be at least 4.0 standard cubic feet per hour per pound of iron catalyst in the dense catalyst phase. At the 2:1 ratio this preferred rate would be 6.0 standard cubic feet of hydrogen and carbon monoxide.

According to a preferred modification of this invention, a fresh feed gas having an $H_2:CO$ ratio higher than the ratio in which these compounds are converted to other compounds is employed and the mol ratio of hydrogen to carbon monoxide in the charge to the reactor is increased to the desired figure by recycling a portion of the unconverted gas, after removal of part or all of the product liquid. Preferably, a gas containing excess hydrogen is processed under conditions effective to react all, or a major proportion, of the carbon monoxide, and a portion of the product mixture, after removal of the greater part of the normally liquid product, is recycled in volumetric ratios to the fresh feed gas of 0.5:1 to 10:1.

Fluid operations are carried out at temperature levels which are relatively high as compared to those which would be permissible in fixed or stationary catalyst bed operations under comparable operating conditions. This results from the excellent heat transfer capacity of the fluidized mass of finely-divided iron and the effect of excess hydrogen in minimizing carbon formation.

The following examples are illustrative of the procedure for manufacturing a hydrogenation catalyst according to this invention and show the final catalyst composition and the yield of hydrocarbon oils and oxygenated compounds produced by the hydrogenation of carbon monoxide. Since the examples are illustrative only of the application and composition of the catalyst, they should not be considered to be unnecessarily limiting to the present invention and are offered merely as a better understanding of the process for the manufacture of a novel catalyst and its performance.

The results obtained when using the catalysts prepared according to this invention are presented in conventional tabular form. The contraction, yield of observed oil and water may be taken as indications of catalyst activity. The yield of observed oil represents the product collected in the primary receiver at room temperature and operating pressure and in the secondary receiver at about −80° F. and atmospheric pressure. This yield of oil is not the total yield of organic compounds since it does not include most of the gaseous hydrocarbons made or the organic compounds soluble in the water product. The yield of observed water represents the aqueous layer recovered in the primary and secondary receiver and includes the organic compounds soluble therein.

The inspections on the oil and water were obtained by conventional methods of analysis and these data may be used as a measure of catalyst selectivity. The unsaturate content of the oil is calculated and reported as the "mol per cent monoolefins" although there may be some diolefins present. The "weight per cent water-KFR" is obtained by use of the Karl Fischer Reagent (KFR) and the difference between that value and 100 per cent is a measure of the organic chemicals (oxychemicals) contained in the observed water product. All of the oxygenated organic compounds (acids, alcohols, aldehydes, ketones, etc.) are not present in the observed water but some are present also in the observed oil product. The yield of acids contained in the water is expressed as the equivalent yield of acetic acid although higher molecular weight acids are also present.

EXAMPLE I

Powdered Alan Wood ore in an amount of about 13,600 grams was thoroughly mixed in a ball-mill with 98 grams of $TiO_2$ and 216 grams of $K_2CO_3$ and the resulting mixture was ground to about 20 to 30 mesh in size. The mixed and ground material was then fused in a fusion apparatus at a temperature of about 2600° F. until the material became a molten mass. The fusion equipment comprised a water cooled copper mold fitted with a carbon electrode. The material was fused in an electric arc projected from the carbon electrode to the base plate of the copper mold. The initial arc was started with the aid of a small quantity of steel shot placed in the bottom of the mold. When the steel shot proceeded to melt, the ore mixture was added slowly. The fusion apparatus drew approximately 600 amperes while the voltage was held constant at 40 volts. The voltage was maintained constant by the automatic regulation of the carbon electrode above the melt. The resulting liquid mass was removed from the fusion apparatus and cooled until it solidified. The solidified mass was broken into large chunks and crushed in a jaw crusher. The material was very brittle and easily crushed. The fragments of molten material were then charged to a reduction chamber in which the material was reduced in the presence of hydrogen at a temperature between about 1400 and 1480° F. for a period of about six hours. A maximum reduction temperature of 1480° F. was observed during the reduction. The average temperature was maintained for two hours after the formation of water ceased.

The reduction process was carried out by passing a stream of hydrogen upwardly through the reduction chamber in which the fragments formed a stationary bed. The catalyst thus produced was designated No. 410–1. This No. 410–1 catalyst contained by weight approximately 1 part $TiO_2$, 1.5 parts $K_2O$, a small amount of silica and alumina in the original ore, and 100 parts metallic iron.

The catalyst produced in the above manner was then tested for the hydrogenation of carbon monoxide to produce hydrocarbons having more than one carbon atom per molecule and oxygenated organic compounds by contacting the catalyst with a gaseous stream comprising hydrogen and carbon monoxide in a mol ratio between about 1.5:1 and about 1.6:1. The carbon dioxide in this gaseous stream averaged about 4.3 volume per cent and light hydrocarbons and nitrogen averaged about 1.7 volume per cent. The reaction conditions and the results obtained from the hydrogenation of carbon monoxide with the fused iron catalyst are shown in Table I below.

*Table I*

| Total Hours of Operation | 44 | 92 | 116 | 140 | 164 | 188 | 212 | 260 |
|---|---|---|---|---|---|---|---|---|
| Pressure, p. s. i. g. | 250 | 250 | 250 | 250 | 250 | 250 | 250 | 250 |
| Catalyst Temp., ° F. | 500 | 520 | 540 | 560 | 580 | 600 | 620 | 630 |
| Gas Rate, V./Hr./V. | 168 | 182 | 190 | 192 | 222 | 240 | 237 | 256 |
| Contraction, percent | 38 | 48 | 49 | 56 | 56 | 60 | 60 | 65 |
| Obs. Oil, cc./m.³ (Total gas at 32° F.) | 20 | 48 | 67 | 74 | 76 | 75 | 80 | 81 |
| Obs. H₂O, cc./m.³ (Total gas at 32° F.) | 20 | 28 | 32 | 45 | 55 | 68 | 85 | 82 |
| Prim. Oil, cc./m.³ (Total gas at 32° F.) | 15 | 40 | 44 | 49 | 52 | 53 | 59 | 54 |
| Percent CO converted | | | | | 93 | | | |
| Percent CO⟶CO₂ | | | | | 22 | | | |
| Feed Gas, Vol. Percent: | | | | | | | | |
| CO₂ | 3.7 | 3.7 | 3.7 | 3.7 | 4.8 | 4.8 | 4.8 | 4.8 |
| H₂ | 58.2 | 58.2 | 58.2 | 58.2 | 55.3 | 55.3 | 55.3 | 55.3 |
| CO | 37.5 | 37.5 | 37.5 | 37.5 | 37.2 | 37.2 | 37.2 | 37.2 |
| Residual | 0.6 | 0.6 | 0.6 | 0.6 | 2.7 | 2.7 | 2.7 | 2.7 |
| H₂/CO | 1.6:1.0 | 1.6:1.0 | 1.6:1.0 | 1.6:1.0 | 1.5:1.0 | 1.5:1.0 | 1.5:1.0 | 1.5:1.0 |
| Mol Wt. | 14 | 14 | 14 | 14 | 14 | 14 | 14 | 14 |

Table I—Continued

| Total Hours of Operation | 44 | 92 | 116 | 140 | 164 | 188 | 212 | 260 |
|---|---|---|---|---|---|---|---|---|
| Tail Gas, Vol. Percent: | | | | | | | | |
| $CO_2$ | | | | | 28.9 | | | |
| $H_2$ | | | | | 53.2 | | | |
| $N_2$ | | | | | 5.6 | | | |
| CO | | | | | 10.7 | | | |
| $CH_4$ | | | | | 1.6 | | | |
| $C_2+$ | | | | | 18 | | | |
| Mol. Wt. | | | | | | | | |
| Oil Inspections: | | | | | | | | |
| Distillation— | | | | | | | | |
| I. B. P., °F | | | | | 133 | 133 | 133 | 133 |
| 5% | | | | | 150 | 150 | 150 | 150 |
| 10% | | | | | 158 | 158 | 158 | 158 |
| 50% | | | | | 333 | 333 | 333 | 333 |
| 90% | | | | | 682 | 682 | 682 | 682 |
| E. P. | | | | | 701 | 701 | 701 | 701 |
| Mol. Wt. | 130 | 130 | 130 | 130 | 143 | 143 | 143 | 143 |
| Monoolefins, mol percent | 35 | 35 | 35 | 35 | 57 | 57 | 57 | 57 |
| Wax, Wt. percent | 7 | 7 | 7 | 7 | 7 | 7 | 7 | 7 |
| Wax, M. P., °F | 185 | 185 | 185 | 185 | 166 | 166 | 166 | 166 |
| $H_2O$ Inspections: | | | | | | | | |
| $H_2O$, K. F. R., Wt. percent | 82 | 82 | 82 | 82 | 84 | 84 | 84 | 84 |
| Percent Acid, Wt. percent $CH_3COOH$ | 5.1 | 5.1 | 5.1 | 5.1 | 2.4 | 2.4 | 2.4 | 2.4 |

Table II below shows the composition of the catalyst with respect to wax and carbon after approximately 250 hours of operation at about 630° F.

Table II

| Catalyst No. | Oil and Wax, Wt. Percent | Wax, M. P. °F. | Carbon, Wt. percent |
|---|---|---|---|
| 410-1 | 6.4 | 234 | 4.3 |

Table III below is a summary of the composition and yields of various catalysts prepared in the manner of Example I. Promoters were incorporated in the catalyst prior to fusion, then the ore was fused and subsequently reduced. The compositions of the catalysts are reported in parts by weight and do not include amounts of alumina, silica, and titania present in the original Alan Wood ore.

EXAMPLE II

Approximately 9080 grams of powdered concentrated Alan Wood ore were mixed thoroughly with approximately 194 grams of powdered $Al_2O_3$ and fused by the electric arc method described in Example I. The melt was removed from the fusion apparatus and cooled to form a solid mass. The solid mass was crushed in a jaw crusher and milled in a disc mill to about 30 mesh in size. Approximately 2.7 grams of $K_2CO_3$ (CP) were dissolved in 25 cc. of distilled water. This solution was added to 500 grams of the fused powder and subsequently an additional 80 cc. of distilled water was added during stirring. The resulting paste was dried in porcelain dishes at about 200° F. for about 12 hours. The dried cake was crushed Table III

| Cat. No. | Original Mixture, Grams | | | | | Catalyst Composition Parts by weight. Iron=100 | | | | Synthesis Conditions and Results, 250 p. s. i. pressure | | | | | | | Catalyst Composition | |
|---|---|---|---|---|---|---|---|---|---|---|---|---|---|---|---|---|---|---|
| | Alan Wood Ore | $K_2CO_3$ | $Al_2O_3$ | CuO | $TiO_2$ | $K_2O$ | CuO | $Al_2O_3$ | $TiO_2$ | Reduction Temp., F. | Gas Rate, V./Hr./V. | Temp., F. | Obs. Oil, cc./m. | Water, cc./m. | Percent $CO \rightarrow CO_2$ | Percent Conv. | Oil, Wt. percent | Carbon, Wt. percent | Hours in Use |
| 375-3 | 13,600 | 286 | 295 | | | 2.0 | | 3.0 | | 1,500 | 189 | 580 | 123 | 98 | 30 | 97 | 7.0 | 3.0 | 210 |
| 396-1 | 13,600 | 433 | 491 | | | 3.0 | | 5.0 | | 1,485 | 171 | 580 | 134 | 110 | 29 | 97 | 7.3 | 3.8 | 210 |
| 406-1 | 6,800 | 50 | | 98 | | 0.7 | 2.0 | | | 1,460 | 236 | 635 | 81 | 93 | 32 | 97 | 4.1 | 5.4 | 300 |
| 407-1 | 6,800 | 108 | | 245 | | 1.5 | 5.0 | | | 1,460 | 252 | 600 | 95 | 66 | 32 | 97 | 4.3 | 3.4 | 300 |
| 408-1 | 6,800 | 108 | 147 | 244 | | 1.5 | 3.0 | 5.0 | | 1,460 | 200 | 600 | 113 | 91 | 30 | 97 | 2.4 | 2.9 | 300 |
| 409-1 | 13,600 | 216 | 98 | | | 1.5 | | 1.0 | | 1,460 | 160 | 620 | 109 | 87 | 52 | 88 | 5.2 | 3.5 | 300 |
| 411-1 | 13,600 | 216 | | | 128 $H_2SiO_3$ | 1.5 | | | 1.0 $SiO_2$ | 1,480 | 235 | 620 | 91 | 79 | 25 | 95 | 4.7 | 4.4 | 300 |
| 416-1 | 6,800 | 108 | | | 147 | 1.5 | | | 3.0 | 1,505 | 214 | 600 | 87 | 91 | 36 | 98 | 4.0 | 4.4 | 260 |
| 417-1 | 6,800 | 108 | | | 245 | 1.5 | | | 5.0 | 1,505 | 251 | 620 | 106 | 89 | 33 | 98 | 3.8 | 4.7 | 290 |
| 418-1 | 6,800 | 108 | 49 | | 147 | 1.5 | | 1.0 | 3.0 | 1,505 | 208 | 600 | 103 | 88 | 30 | 97 | 2.9 | 2.7 | 240 |
| 419-1 | 6,800 | 108 | 490 | | | 1.5 | | 10.0 | | 1,505 | 245 | 630 | 111 | 89 | 32 | 96 | 2.7 | 1.8 | 240 |
| 420-1 | 6,800 | 108 | | | | 1.5 | | | | 1,505 | 240 | 600 | 97 | 87 | | | 6.2 | 5.8 | 260 |
| 421-1 | 6,800 | 108 | | | | 1.5 | | | 5.0 MgO | 1,505 | 172 | 560 | 90 | 68 | 32 | 95 | 6.1 | 5.9 | 215 |
| 422-1 | 6,800 | 108 | | | 245 MgO | 1.5 | | | 5.0 ZnO | 1,450 | 235 | 580 | 114 | 84 | 38 | 97 | 4.7 | 4.2 | 150 |
| 425-1 | 3,050 | 49 | | | 115 ZnO | 1.5 | | | 5.0 $CeO_2$ | 1,450 | 244 | 600 | 105 | 88 | 28 | 98 | 6.4 | 4.6 | 190 |
| 426-1 | 6,800 | 108 | 147 | 490 | 245 $CeO_2$ | 1.5 | 10.0 | 3.0 | 5.0 $CeO_2$ | 1,450 | 245 | 600 | 155 | 77 | 24 | 97 | 1.3 | 5.0 | 190 |
| 427-1 | 6,800 | 108 | | 245 | 147 | 1.5 | 5.0 | | | 1,450 | 184 | 580 | 149 | 80 | 28 | 97 | 3.8 | 2.9 | 240 |
| 428-1 | 6,800 | 216 | 147 | 245 | | 3.0 | 5.0 | 3.0 | 3.0 | 1,450 | 233 | 580 | 111 | 78 | 27 | 97 | 4.0 | 3.6 | 240 |
| 430-1-2 | 3,490 | 110 | 1,005 | | | 3.0 | | 40.0 | | 1,455 | 200 | 650 | 100 | 89 | 27 | 97 | 2.0 | 2.0 | 240 |
| 431-1 | 3,410 | 100 | 1,350 | | | 3.0 | | 60.0 | | 1,455 | 200 | 650 | 94 | 91 | 26 | 96 | 2.1 | 1.0 | 290 |
| 432-1-2 | 2,853 | 90 | 1,640 | | | 3.0 | | 80.0 | | 1,455 | 195 | 650 | 93 | 72 | 32 | 95 | 2.5 | 2.3 | 200 |
| 433-1 | 3,910 | 124 | 563 | | | 3.0 | | 20.0 | | 1,460 | 220 | 635 | 100 | 93 | 32 | 97 | 2.3 | 1.2 | 200 |
| 434-1 | 2,850 | 90 | 2,050 | | | 3.0 | | 100.0 | | 1,460 | 137 | 660 | 99 | 93 | 26 | 92 | 1.8 | 6.6 | 290 |
| 435-1 | 6,800 | 216 | | | | 3.0 | | | | 1,460 | 243 | 660 | 91 | 88 | 24 | 97 | 4.4 | 3.9 | 340 |
| 436-1 | 6,800 | 108 | | | 245 Co | 1.5 | | | 5.0 Co | 1,450 | 158 | 580 | 103 | 71 | 27 | 97 | 6.3 | 2.6 | 340 |
| 439-1 | 6,800 | 108 | | | 245 Ti | 1.5 | | | 5.0 Ti | 1,450 | 207 | 620 | 96 | 82 | 44 | 95 | 3.7 | 1.9 | 210 |
| 440-1 | 6,800 | 108 | | | 245 Si | 1.5 | | | 5.0 Si | 1,450 | 150 | 560 | 58 | 43 | 32 | 88 | 5.5 | | 210 | and pulverized and subsequently pelleted to ⅛ inch diameter pellets. The pelleted material was then reduced with hydrogen at a temperature of about 1475° F. until the formation of water ceased and thereafter at 1450° F. for one hour. This catalyst had a composition by weight of about 3 parts $Al_2O_3$, about 0.5 part $K_2O$, a small amount silica and titania present from the original ore, and 100 parts metallic iron. The catalyst was designated No. 373-2.

The reduced catalyst prepared in the above manner was charged to a reaction zone taking precautions to maintain the catalyst in an inert atmosphere, such as carbon dioxide, during charging. A stream of hydrogen was passed through the reaction chamber while the chamber was brought to the desired process temperature. After the catalyst and reaction chamber were at the desired temperature, a stream of hydrogen and carbon monoxide at a mol ratio of about 1.4:1 was passed through the catalyst mass. This was continued for about 260 hours after which the ratio of hydrogen to carbon monoxide was changed to about 1.7:1 and continued at this mol ratio for about 75 hours. The temperature during operation was gradually increased from about 500° F. to about 620° F. The operating conditions and results obtained with this catalyst are shown in Table IV below. The analysis of the used catalyst is summarized in Table V below.

EXAMPLE III

Approximately 14.2 grams of $H_2MoO_4$ (85 per cent acid) was dissolved in a solution of 80 cc. of water and 20 cc. of $NH_4OH$ (28 per cent $NH_3$). The basic molybdate solution was thoroughly impregnated into 500 grams of powdered concentrated Alan Wood ore by mixing thoroughly until the formation of a paste. The paste was dried overnight at a temperature of about 220 to about 230° F. The dried material was then crushed to a powder and calcined at a temperature of about 1450° F. for about two hours in a muffle furnace. After calcination the material was admixed with about 7.9 grams of $K_2CO_3$ dissolved in 100 cc. of water. The resulting pasty mixture was allowed to dry at about 220° F. for several hours and then ground to a size less than about 30 mesh in preparation for pelleting. The calcined material after impregnation with $K_2CO_3$ was pulverized and pelleted to about ⅛ inch diameter pellets. The pelleted material was then reduced with hydrogen at a temperature of about 1490° F. for several hours until the formation of water ceased and was continued thereafter for about one hour at about 1450° F. The resulting catalyst was designated No. 395-1 and had a composition approximately as follows: 3 parts by weight $MoO_3$, 1.5 parts by weight $K_2O$, small amounts of alumina, titania and silica present in the original ore, and 100 parts by weight me-

*Table IV*

| Total Hours of Operation | 64 | 88 | 160 | 184 | 209 | 257 | 329 |
|---|---|---|---|---|---|---|---|
| Pressure, p. s. i. g. | 250 | 250 | 250 | 250 | 250 | 250 | 250 |
| Catalyst Temp., ° F | 520 | 540 | 560 | 580 | 580 | 600 | 620 |
| Gas Rate, V./Hr./V | 138 | 174 | 153 | 121 | 205 | 167 | 142 |
| Contraction | 42 | 48 | 42 | 47 | 44 | 44 | 38 |
| Obs. Oil, cc./m³ (Tot. Gas at 32° F.) | 76 | 60 | 64 | 60 | 47 | 38 | 14 |
| Obs. H₂O, cc./m³ (Tot. Gas at 32° F.) | 59 | 68 | 83 | 73 | 69 | 71 | 68 |
| Prim. Oil, cc./m³ | 60 | 64 | 54 | 38 | 24 | 22 | 0 |
| CO converted | | | | 97 | | | |
| CO→CO₂ | | | | 34 | | | |
| Feed Gas, Vol. Percent: | | | | | | | |
| CO₂ | 5.7 | 5.7 | 2.3 | 2.3 | 3.5 | 3.5 | 2.3 |
| H₂ | 53.3 | 53.3 | 54.1 | 54.1 | 54.0 | 54.0 | 56.3 |
| CO | 34.7 | 34.7 | 38.7 | 38.7 | 39.1 | 39.1 | 32.6 |
| Residual | 6.3 | 6.3 | 4.9 | 4.9 | 3.4 | 3.4 | 8.8 |
| Mol. Wt | | | 15 | 15 | 15 | 15 | 18 |
| H₂/CO | 1.5:1.0 | 1.5:1.0 | 1.4:1.0 | 1.4:1.0 | 1.4:1.0 | 1.4:1.0 | 1.7:1.0 |
| Product Gas, Vol. Percent: | | | | | | | |
| CO₂ | | | | 29.5 | | | |
| CO | | | | 2.3 | | | |
| Unsaturates | | | | 3.1 | | | |
| Mol. Wt | 20 | 22 | 21 | 24 | 23 | 23 | 21 |
| Oil Inspections: | | | | | | | |
| Distillation— | | | | | | | |
| I.B.P., ° F | 96 | 96 | 96 | 96 | 96 | | |
| 5% | 116 | 116 | 116 | 116 | 116 | | |
| 10% | 132 | 132 | 132 | 132 | 132 | | |
| 50% | 274 | 274 | 274 | 274 | 274 | | |
| 90% | (580) | (580) | (580) | (580) | (580) | | |
| E.P. | 638 | 638 | 638 | 638 | 638 | | |
| Mol. Wt | 121 | 121 | 121 | 121 | 121 | | |
| Monoolefins, mol. Percent | 48 | 48 | 48 | 48 | 48 | | |
| Wax, Wt. Percent | 1 | 1 | 1 | 1 | 1 | | |
| M.P., Wax, ° F | 146 | 146 | 146 | 146 | 146 | | |
| H₂O Inspections: | | | | | | | |
| H₂O, K.F.R., Wt. Percent | 87 | 87 | 87 | 87 | 87 | | |
| Percent Acid (Wt. Percent CH₃COOH) | 0.8 | 0.8 | 0.8 | 0.8 | 0.8 | | |

*Table V*

| Catalyst No. | Oil and Wax, Wt. Percent | Wax, M. P. ° F. | Carbon, Weight Percent |
|---|---|---|---|
| 373-2 | 0.7 | 2.5 | 2.1 | tallic iron. This catalyst was charged to a reaction zone in an inert atmosphere until the temperature of reaction had been reached. When a temperature of about 500° F. had been reached, a stream of hydrogen and carbon monoxide in a mol ratio of about 1.9:1 was passed through the catalyst. This was continued for a sufficient length of time to obtain operating data.

Operation conditions and results for this particular catalyst are shown in Table VI below.

these catalysts and the results are shown in Table VIII along with other catalysts prepared

*Table VI*

| Total Hours of Operation | 38 | 61 | 133 | 167 | 191 | 215 |
|---|---|---|---|---|---|---|
| Pressure, p. s. i. g | 250 | 250 | 250 | 250 | 250 | 250 |
| Catalyst Temp., °F | 500 | 520 | 560 | 580 | 600 | 620 |
| Gas Rate, V./Hr./V | 118 | 120 | 129 | 105 | 143 | 177 |
| Contraction, Percent | 14 | 21 | 36 | 37 | 45 | 49 |
| Obs. Oil, cc./m.³ (Tot. Gas at 32° F.) | | 4 | 41 | 61 | 63 | 66 |
| Obs. H₂, cc./m.³ (Tot. Gas at 32° F.) | 9 | 13 | 16 | 38 | 26 | 40 |
| Primary Oil, cc./m.³ | | | 31 | 46 | 42 | 46 |
| Percent CO converted | | | | | 88 | |
| Percent CO → CO₂ | | | | | 29 | |
| Feed Gas, Vol. Percent: | | | | | | |
| CO₂ | 7.2 | 7.2 | 7.2 | 4.4 | 4.4 | 4.4 |
| H₂ | 59.7 | 59.7 | 59.7 | 57.1 | 57.1 | 57.1 |
| CO | 31.3 | 31.3 | 31.3 | 37.1 | 37.1 | 37.1 |
| Residual | 1.8 | 1.8 | 1.8 | 1.4 | 1.4 | 1.4 |
| H₂/CO | 1.9:1.0 | 1.9:1.0 | 1.9:1.0 | 1.5:1.0 | 1.5:1.0 | 1.5:1.0 |
| Mol. Wt | 14 | 14 | 14 | 14 | 14 | 14 |
| Product Gas, Vol. Percent: | | | | | | |
| CO₂ | | | | 27.6 | 27.6 | 27.6 |
| CO | | | | 8.6 | 8.6 | 8.6 |
| Unsaturates | | | | 2.7 | 2.7 | 2.7 |
| Oil Inspections: | | | | | | |
| Mol. Wt | | | | 130 | 130 | 130 |
| Monoolefins, Mol. Percent | | | | 40 | 40 | 40 |
| Wax, Wt. Percent | | | | 4.1 | 4.1 | 4.1 |
| Wax, M. P., °F | | | | 149 | 149 | 149 |
| H₂O Inspections: | | | | | | |
| H₂O, K. F. R., Wt. Percent | | | | 79 | 79 | 79 |
| Acidity (Wt. Percent CH₃COOH) | | | | 2.6 | 2.6 | 2.6 |

Table VII shows the wax and carbon formation on the catalyst after use for over 200 hours.

*Table VII*

| Catalyst No. | Oil + Wax, Wt. Percent | Wax, M. P., °F | Carbon, Wt. Percent |
|---|---|---|---|
| 395-1 | 5.1 | 241 | 5.8 |

Several catalysts were prepared in a similar manner to the catalyst of Example III with the addition of a carbon inhibitor after calcining. Such carbon inhibitors incorporated into the catalyst before reduction but after calcination were SnCl₄ and Pb(NO₃)₂. The compositions of in a similar manner as the catalyst No. 395-1 of Example III. Aside from the reported analysis of the catalysts, a small amount of titania, silica, and alumina, usually less than two or three per cent by weight total, is present in the ultimate catalyst as previously discussed. Unless otherwise specified aluminum was incorporated into the catalyst as AlCl₃·6H₂O and reported as Al₂O₃ in all instances. Similarly, the potassium content of the catalyst was reported in all instances as K₂O based on Fe.

*Table VIII*

| Cat. No. | Original Mixture, grams | | | | Catalyst Composition Parts by weight, Iron=100 | | | Operating Conditions and Results, 250 p. s. i. pressure | | | | | | | | Catalyst after about 250 hours | |
|---|---|---|---|---|---|---|---|---|---|---|---|---|---|---|---|---|---|
| | Alan Wood Ore | K₂CO₃* | AlCl₃·6H₂O | | K₂O | Al₂O₃ | | Calcination Temp., °F | Reduction Temp., °F | Gas Rate, V./Hr./V. | Temp., °F | Obs. Oil, cc./m.³ | H₂O cc./m.³ | Percent CO→CO₂ | Percent Conv. | Wax, Wt. Percent | Carbon, Wt. Percent |
| 373.6 | 500 | 7.9 | 130.5 | Al(COOH)₃ | 1.5 | 3.0 | | 1,400 | 1,475 | 228 | 580 | 123 | 95 | 31 | 98 | 7.9 | 2.3 |
| 373.7 | 500 | 5.3 | 50.7 | | 1.0 | 3.0 | | 1,410 | 1,475 | 193 | 580 | 107 | 83 | 28 | 95 | 9.7 | 3.2 |
| 373.8 | 500 | 7.9 | 50.7 | | 1.5 | 3.0 | | 1,420 | 1,475 | 186 | 580 | 113 | 90 | 23 | 96 | 8.7 | 2.6 |
| 373.12 | 13,600 | 2.6 | 2,160 | Al(NO₃)₃·9H₂O | 1.5 | 3.0 | | 1,450 | 1,480 | 215 | 580 | 94 | 95 | 26 | 97 | 8.4 | 4.3 |
| 374-1 | 500 | 7.3 | 110 | Al(NO₃)₃·9H₂O | 1.5 | 3.0 | | 1,410 | 1,475 | 203 | 500 | 90 | 83 | 24 | 97 | 6.1 | 3.2 |
| 378-1 | 500 | 4.7 | 500 | | 1.0 | 1.6 | | 1,420 | 1,500 | 196 | 540 | 99 | 62 | | | 11.3 | 4.1 |
| 382-1 | 500 | 7.9 | 84.9 | | 1.5 | 5.0 | | 1,420 | 1,500 | 175 | 560 | 102 | 61 | 33 | 96 | 8.5 | 6.0 |
| 383-1 | 500 | 7.9 | 33.7 | | 1.0 | 2.0 | | 1,400 | 1,500 | 178 | 580 | 100 | 102 | 24 | 95 | 6.1 | 3.3 |
| 384-1 | 500 | 7.9 | 50.7 | 0.94 SnCl₅·5H₂O* | 1.5 | 3.0 | 0.1 SnO | 1,420 | 1,485 | 180 | 600 | 104 | 93 | 27 | 96 | 5.7 | 2.8 |
| 385-1 | 500 | 7.9 | 50.7 | 0.53 Pb(NO₃)₂* | 1.5 | 3.0 | 1.1 PbO | 1,400 | 1,485 | 190 | 600 | 108 | 91 | | | 7.4 | 6.9 |
| 390-1 | 500 | 7.9 | | 16.5 Ti(NO₃)₄ | 1.5 | | 3.0 TiO₂ | 1,400 | 1,475 | 210 | 600 | 93 | 89 | 26 | 95 | 2.3 | 2.8 |
| 391-1 | 500 | 7.9 | | 30.5 SiCl₄ | 1.0 | | 3.0 SiO₂ | 1,400 | 1,485 | 238 | 600 | 80 | 80 | 31 | 98 | 8.1 | 2.7 |
| 392-1 | 500 | 15.7 | 84.9 | | 3.0 | 5.0 | | 1,400 | 1,485 | 210 | 540 | 85 | 63 | 30 | 98 | 8.5 | 4.0 |
| 393-1 | 500 | | 84.9 | 6.6 Rb₂CO₃* | | 5.0 | 1.5 Rb₂O | 1,400 | 1,485 | 205 | 540 | 78 | 66 | 27 | 98 | 2.7 | 3.6 |
| 394-1 | 500 | | 84.9 | 6.2 Cs₂CO₃* | | 5.0 | 1.5 Cs₂O | 1,400 | 1,485 | 204 | 540 | 73 | 71 | 33 | 98 | 4.0 | 6.0 |
| 399-1 | 500 | 3.6 | | 21.3 Cu(NO₃)₂·3H₂O | 1.0 | | 2.0 CuO | 1,400 | 1,485 | 158 | 580 | 90 | 79 | 34 | 95 | 9.1 | 4.2 |
| 402-1 | 500 | 7.9 | | 54 Cu(NO₃)₂·3H₂O | 1.5 | | 5.0 CuO | 1,400 | 1,425 | 213 | 600 | 79 | 77 | 12 | 97 | 8.6 | 4.1 |
| 403-1 | 500 | 7.9 | 70.7 | 54 Cu(NO₃)₂·3H₂O | 1.5 | | 5.0 CuO | 1,400 | 1,485 | 214 | 600 | 71 | 82 | 20 | 96 | 8.7 | 3.5 |
| 397-1 | 500 | | 68.1 | Co(NO₃)₂·11.3 Th(NO₃)₄ | | | 3.0 CoO 1.5 ThO₂ | | 1,485 | 153 | 540 | 16 | 45 | 36 | 86 | 1.0 | 3.9 |

*Added after calcination.

EXAMPLE IV

About 50.7 grams of AlCl₃·6H₂O were dissolved in 50 cc. of distilled water and this solution was mixed thoroughly with about 500 grams of powdered concentrated Alan Wood ore to form a paste. The paste was dried overnight at about 250° F. The dried material was crushed to a powder and was further impregnated with a solution of K₂CO₃ prepared by dissolving 7.9 grams of K₂CO₃ in 75 cc. of distilled water. When stirred thoroughly to form a paste, the paste was dried at 250° F. for several hours. One per cent graphite was added to the dried material and it was pelleted into $\frac{3}{16}$ inch diameter pellets. The pelleted material was reduced in a gas fired hydrogen recirculating furnace at a maximum temperature of about 1450° F. The temperature was maintained above 1425° F. for 1.5 hours after with hydrogen at about 1100° F. for about 50 hours until the formation of water ceased. The reduced Alan Wood ore catalyst was charged to a reaction chamber in an atmosphere of carbon dioxide. The reaction chamber and catalyst were brought to a temperature of about 500° F. and then the synthesis gas comprising hydrogen and carbon monoxide in a mol ratio of about 2:1 was introduced into the reaction chamber. A pressure of approximately 250 pounds per square inch was maintained during the run. Operating conditions and results obtained by the hydrogenation of carbon monoxide with this fused catalyst are shown in Table XI below. Table

*Table IX*

| Total Hours of Operation | 41 | 114 | 138 | 162 | 186 | 210 |
|---|---|---|---|---|---|---|
| Pressure, p. s. i. g | 250 | 250 | 250 | 250 | 250 | 250 |
| Catalyst Temp., °F | 500 | 540 | 560 | 580 | 600 | 620 |
| Gas Rate, V./Hr./V | 131 | 129 | 126 | 125 | 166 | 211 |
| Contraction, Percent | 15 | 31 | 34 | 37 | 39 | 44 |
| Obs. Oil, cc./m.³ (Tot. Gas at 32° F.) | 27 | 35 | 58 | 54 | 40 | 38 |
| Obs. H₂O, cc./m.³ (Tot. Gas at 32° F.) | 45 | 49 | 51 | 52 | 64 | 84 |
| Prim. Oil, cc./m.³ | 11 | 13 | 23 | 18 | 10 | 7 |
| CO converted, Percent | | | | | | 96 |
| CO → CO₂, Percent | | | | | | 31 |
| Feed Gas, vol. Percent: | | | | | | |
| CO₂ | 5.2 | 3.3 | 3.3 | 4.3 | 4.3 | 4.3 |
| H₂ | 54.0 | 56.7 | 56.7 | 60.1 | 60.1 | 60.1 |
| CO | 36.3 | 35.4 | 35.4 | 34.8 | 34.8 | 34.8 |
| Residual | 4.5 | 4.6 | 4.6 | 0.8 | 0.8 | 0.8 |
| H₂/CO | 1.5:1.0 | 1.6:1.0 | 1.6:1.0 | 1.7:1.0 | 1.7:1.0 | 1.7:1.0 |
| Mol. Wt | | 15 | 15 | 14 | 14 | 14 |
| Product Gas, Vol. Percent: | | | | | | |
| CO₂ | | | | | | 27.3 |
| CO | | | | | | 2.4 |
| Unsaturates | | | | | | 3.3 |
| Mol. Wt | 15 | 16 | 19 | 19 | 20 | 21 |
| Oil Inspections: | | | | | | |
| Mol. Wt | 130 | 130 | 130 | 130 | 130 | 130 |
| Monoolefins, Mol. Percent | 62.6 | 62.6 | 62.6 | 62.6 | 62.6 | 62.6 |
| Wax, Wt. Percent | 2.6 | 2.6 | 2.6 | 2.6 | 2.6 | 2.6 |
| Melting Point, °F | 144 | 144 | 144 | 144 | 144 | 144 |
| H₂O Inspections: | | | | | | |
| H₂O, K. F. R., Wt. Percent | 92 | 92 | 92 | 92 | 92 | 92 |
| Acid, Wt. Percent CH₃COOH | 0.5 | 0.5 | 0.5 | 0.5 | 0.5 | 0.5 | the formation of water ceased. The composition of the catalyst prepared in this manner was about 3 parts by weight Al₂O₃, about 1.5 parts by weight K₂O, a small proportion of titania and silica present in the original ore, and 100 parts by weight metallic iron. The catalyst was designated No. 381–1. The catalyst thus prepared was used to hydrogenate carbon monoxide according to the conditions shown in Table IX. The synthesis gas used contained hydrogen and carbon monoxide in a mol ratio of about 1.5:1 to 1.7:1. The CO₂ in the synthesis gas averaged about 4.3 volume per cent and the total light hydrocarbons and nitrogen averaged about 3.3 volume per cent. Table X below shows the formation of wax and carbon on the catalyst after about 200 hours of use.

*Table X*

| Catalyst No. | Oil and Wax, Wt. Percent | Wax, M. P., °F. | Carbon, Wt. Percent |
|---|---|---|---|
| 381–1 | 1.0 | 220 | 4.9 |

EXAMPLE V

Several hundred grams of powdered concentrated Alan Wood ore were fused in the electric fusion apparatus of Example I to form a molten mass. The molten mass was cooled and solidified. The solidified mass was crushed in a jaw crusher and then ball milled to a size substantially less than 30 mesh. The pulverized fused Alan Wood ore was then pelleted to about ¼ inch diameter pellets in preparation for reduction. The pelleted Alan Wood ore was reduced XII shows the accumulation of wax and carbon from the catalyst after about 200 hours of use. This catalyst was designated No. 256.

*Table XI*

| Total hours operation | 121 | 145 | 168 |
|---|---|---|---|
| Pressure, p. s. i. g | 250 | 250 | 250 |
| Catalyst Temp., °F | 497 | 511 | 516 |
| Gas Rate, V./Hr./V | 105 | 93 | 94 |
| Percent Concentration | 26 | 29 | 30 |
| Obs. Oil cc./m.³ (Tot. gas at 32° F.) | 42 | 47 | 42 |
| H₂O cc./m.³ (Tot. gas at 32° F.) | 62 | 59 | 51 |
| Percent CO converted | 45 | 60 | 65 |
| Percent COCO₂ | 6 | 12 | 18 |
| Feed Gas, Vol. Percent: | | | |
| CO₂ | 1.2 | 1.2 | 1.2 |
| H₂ | 65.4 | 65.4 | 65.4 |
| CO | 30.4 | 30.4 | 30.4 |
| Residual | 3.0 | 3.0 | 3.0 |
| H₂/CO | 2.2:1.0 | 2.2:1.0 | 2.2:1.0 |
| Mol. Wt | 12.1 | 12.1 | 12.1 |
| Product Gas, Vol. Percent: | | | |
| CO₂ | 3.9 | 6.7 | 9.6 |
| Unsaturates | 1.0 | 0.8 | 0.6 |
| CO | 23.3 | 18.2 | 15.9 |
| Mol. Wt | 13.5 | 14.1 | 14.7 |
| Oil Inspections: | | | |
| Sp. Gr | 0.756 | 0.756 | 0.756 |
| Mol. Percent, Monoolefins | 23 | 23 | 23 |
| H₂O Inspections: | | | |
| H₂O, K. F. R., Wt. Percent | 90.9 | 90.9 | 90.9 |
| Acid, (Wt. Percent CH₃COOH) | 0.1 | 0.1 | 0.1 |

*Table XII*

| Catalyst No. | Wt. Percent Oil and Wax | Wt. Percent Carbon |
|---|---|---|
| 256 | 0.2 | 0.7 |

In all catalyst compositions reported herein, the iron after reduction was reported as Fe. The reduction process may not completely reduce the iron oxides to Fe and, consequently, small proportion of the iron may be present in other forms. The catalyst compositions reported only the added ingredients in preparing the catalyst. Thus, such materials as silica, alumina, and titania will be present to some extent in the catalyst in all cases where Alan Wood ore was the source of the iron compound raw material whether or not actually reported.

Having described our invention, we claim:

1. A process for hydrogenating a carbon oxide which comprises continuously flowing a gaseous mixture comprising hydrogen and a carbon oxide upwardly through a reaction zone in the presence of finely-divided reduced naturally occurring magnetite containing a minor amount of alumina, silica, and titania in the natural state at a velocity effective to suspend said finely-divided material and under conditions such that hydrogen and carbon oxide are converted to organic compounds and recovering the organic compounds thus produced.

2. A process for hydrogenating carbon monoxide which comprises continuously flowing a gaseous mixture comprising hydrogen and carbon monoxide upwardly through a reaction zone in the presence of a finely-divided catalyst consisting essentially of reduced naturally occurring magnetite containing a minor amount of alumina, silica, and titania in the natural state in combination with an added promoter at a velocity effective to suspend said finely-divided catalyst in said gaseous mixture and under conditions such that hydrogen and carbon monoxide are converted to organic compounds and recovering the organic compounds thus produced as products of the process.

3. The process of claim 2 in which the promoter comprises silicon.

4. The process of claim 2 in which said promoter comprises titanium.

5. The process of claim 2 in which said promoter comprises an alkali metal.

6. A process for hydrogenating carbon monoxide which comprises continuously flowing a gaseous mixture comprising hydrogen and carbon monoxide through a reaction zone in the presence of a finely-divided catalyst comprising reduced naturally occurring magnetite containing about 1 to 2 per cent of alumina, about 1 per cent silica, and about 0.4 to 1 per cent titania by weight in the natural state in combination with an added promoter at a velocity effective to suspend said finely-divided catalyst in said reaction mixture and under conditions such that hydrogen and carbon monoxide are converted to organic compounds and recovering organic compounds thus produced as products of the process, said finely-divided catalyst having been heat treated at a temperature above 1000° F. in a non-reducing atmosphere prior to reduction.

7. A process for hydrogenating a carbon oxide which comprises flowing a gaseous mixture comprising hydrogen and a carbon oxide through a reaction zone in the presence of a finely-divided catalyst consisting essentially of reduced iron at a velocity effective to suspend said finely-divided catalyst in said reaction mixture and under conditions such that hydrogen and carbon oxide are converted to organic compounds and recovering organic compounds thus produced as products of the process, said finely-divided iron catalyst having been prepared by the steps comprising incorporating a naturally occurring magnetite containing a minor amount of alumina, silica and titania with a minor amount of a compound capable of acting as a promoter in the hydrogenation reaction, heat treating the resulting mixture at a temperature above about 1000° F. for at least two hours in a non-reducing atmosphere, pulverizing the heat treated material to the desired size for suspension in said gaseous mixture of the process and reducing the heat treated material at an elevated temperature to reduce iron oxide to the elementary metal.

8. A process for hydrogenating a carbon oxide which comprises continuously flowing a gaseous mixture comprising hydrogen and a carbon oxide upwardly through a reaction zone in the presence of a finely-divided catalyst consisting essentially of reduced iron at a velocity effective to suspend the finely-divided catalyst in the gaseous mixture and under conditions such that hydrogen and carbon oxide are converted to organic compounds and recovering organic compounds thus produced as the products of the process, said catalyst having been prepared by the steps comprising fusing a naturally occurring magnetite containing a minor amount of alumina, silica and titania at a temperature above about 2000° F., pulverizing the fused material, and reducing the fused material at an elevated temperature to elementary metal.

9. The process of claim 8 in which said naturally occurring magnetite contains about 1 to 2 per cent of alumina, about 1 per cent of silica, and about 0.4 to 1 per cent of titania by weight in the natural state.

10. The process of claim 8 in which a compound capable of acting as a promoter is admixed with the naturally occurring magnetite prior to fusion.

11. The process of claim 10 in which said compound capable of acting as a promoter is a nitrate.

12. The process of claim 10 in which said compound capable of acting as a promoter is a carbonate.

13. The process of claim 10 in which said compound capable of acting as a promoter is an oxide.

14. The process of claim 8 in which a compound capable of acting as a promoter is incorporated with the catalyst after fusion and before reduction.

15. The process of claim 14 in which said compound capable of acting as a promoter is a compound containing oxygen selected from the group consisting of an alkali metal and an alkaline earth metal and mixtures thereof.

16. A process for hydrogenating a carbon oxide which comprises continuously flowing a gaseous mixture comprising hydrogen and a carbon oxide upwardly through a reaction zone in the presence of a finely-divided catalyst consisting essentially of reduced iron at a velocity effective to suspend said finely-divided catalyst in said gaseous mixture and under conditions such that hydrogen and carbon oxides are converted to organic compounds and recovering organic compounds thus produced as the products of the process, said finely-divided iron catalyst having been prepared by the steps comprising admixing a naturally occurring magnetite with a promoter, calcining the resulting mixture at a temperature between about 1000 and about 1600° F. for at least two hours, pulverizing the calcined material, and subsequently reducing the calcined material at an elevated temperature to elementary metal.

17. A process for hydrogenating a carbon oxide which comprises continuously flowing a gaseous mixture comprising hydrogen and a carbon oxide upwardly in a reaction zone through a mass comprising a finely-divided catalyst comprising metallic iron as the major component at a velocity sufficiently low to maintain the finely-divided catalyst in a dense fluidized pseudo-liquid condition but sufficiently high to produce rapid circulation of the catalyst particles in the pseudo-liquid dense phase, said finely-divided iron catalyst having been prepared by the steps comprising admixing a naturally occurring magnetite containing a minor amount of alumina, silica and titania with a promoter, fusing the resulting mixture to form a molten mass, solidifying said molten mass, pulverizing the molten mass to a size less than about 250 microns, admixing with said pulverized mass a potassium compound containing oxygen, reducing the mixture of fused material and potassium compound with hydrogen at a temperature between 900° F. and about 1600° F. until the formation of water substantially ceases, and repulverizing the reduced material in the presence of carbon dioxide.

18. A process for the hydrogenation of a carbon oxide which comprises continuously flowing a gaseous mixture comprising hydrogen and a carbon oxide upwardly through a reaction zone in the presence of a finely-divided catalyst consisting essentially of reduced iron at a velocity effective to suspend said finely-divided catalyst in said gaseous mixture and under conditions such that hydrogen and carbon oxide are converted to organic compounds as products of the process, said catalyst having been prepared by the steps comprising admixing naturally occurring magnetite containing a minor amount of alumina, silica, and titania with a promoter, fusing the resulting mixture to form a molten mass, solidifying the molten mass, pulverizing the solidified mass to a size less than about 250 microns, and reducing the finely-divided material thus produced with hydrogen at an elevated temperature to obtain elementary iron, the combined amount of alumina, silica, and titania originally present in the naturally occurring magnetite being less than 2 weight per cent of the final catalyst composition after reduction.

19. The process of claim 18 in which said promoter comprises an oxygen containing compound of an alkali metal.

20. A process for hydrogenating a carbon oxide which comprises flowing a gaseous mixture comprising hydrogen and a carbon oxide through a reaction zone in the presence of a finely-divided catalyst comprising iron at a velocity effective to suspend said finely-divided catalyst in said reaction zone under conditions such that hydrogen and carbon oxide are converted to organic compounds and recovering organic compounds thus produced as products of the process, said finely-divided iron catalyst having been prepared by the steps comprising incorporating a naturally occurring magnetite containing a minor amount of alumina, silica and titania with a minor amount of a compound capable of acting as a promoter in the hydrogenation reaction, heating the resulting mixture to a temperature above about 1000° F., and subsequently reducing the mixture thus heated at an elevated temperature to reduce iron oxide to the elementary metal.

21. A process for hydrogenating a carbon oxide which comprises flowing a gaseous mixture comprising hydrogen and a carbon oxide through a reaction zone in the presence of an iron catalyst under conditions such that hydrogen and carbon oxide are converted to organic compounds and recovering organic compounds thus produced as products of the process, said iron catalyst having been prepared by the steps comprising calcining a mixture of magnetite and a promoter at a temperature above about 1000° F. for at least about two hours, and subsequently reducing the calcined material with hydrogen at an elevated temperature to the elementary metal.

22. A process for hydrogenating a carbon oxide which comprises flowing a gaseous mixture comprising hydrogen and a carbon oxide through a reaction zone in the presence of an iron catalyst under conditions such that hydrogen and carbon oxide are converted to organic compounds and recovering organic compounds thus produced as products of the process, said iron catalyst having been prepared by the steps comprising calcining a naturally occurring magnetite at a temperature between about 1000° F. and about 1600° F. for at least two hours, and subsequently reducing the calcined material with hydrogen at an elevated temperature to the elementary metal.

23. A process for hydrogenating a carbon oxide which comprises flowing a gaseous mixture comprising hydrogen and a carbon oxide through a reaction zone in the presence of an iron catalyst under conditions such that hydrogen and carbon oxide are converted to organic compounds and recovering organic compounds thus produced as products of the process, said iron catalyst having been prepared by the steps comprising calcining a naturally occurring magnetite at a temperature above about 1000° F., and subsequently reducing the calcined material with hydrogen at an elevated temperature to the elementary metal.

24. A process for hydrogenating a carbon oxide which comprises flowing a gaseous mixture comprising hydrogen and a carbon oxide through a reaction zone in the presence of a reduced iron catalyst prepared from naturally occurring magnetite containing a minor amount of silica, alumina and titania under conditions such that hydrogen and carbon oxide are converted to organic compounds and recovering organic compounds thus produced.

25. A process for hydrogenating a carbon oxide which comprises flowing a gaseous mixture comprising hydrogen and a carbon oxide through a reaction zone in the presence of a reduced iron catalyst under conditions such that hydrogen and carbon oxide are converted to organic compounds and recovering organic compounds thus produced as products of the process, said reduced iron catalyst having been prepared by the steps comprising fusing a naturally occurring magnetite to form a molten mass, cooling the molten mass to solidify same, pulverizing the fused material, and reducing fused material at an elevated temperature to elementary metal.

References Cited in the file of this patent

UNITED STATES PATENTS

| Number | Name | Date |
|---|---|---|
| 2,287,891 | Linkh | June 30, 1942 |
| 2,417,164 | Huber, Jr. | Mar. 11, 1947 |
| 2,438,584 | Stewart | Mar. 30, 1948 |
| 2,455,419 | Johnson | Dec. 7, 1948 |
| 2,471,129 | Vesterdal | May 24, 1949 |
| 2,488,530 | Friedman et al. | Nov. 22, 1949 |
| 2,527,846 | Phinney et al. | Oct. 31, 1950 |